(12) United States Patent
Green

(10) Patent No.: US 11,598,457 B2
(45) Date of Patent: Mar. 7, 2023

(54) CLAMP APPARATUS AND METHOD OF USE OR MANUFACTURE THEREOF

(71) Applicant: Teconnex Ltd, Keighley Yorkshire (GB)

(72) Inventor: Richard Green, Keighley Yorkshire (GB)

(73) Assignee: Teconnex Ltd., Keighley Yorkshire (GB)

( * ) Notice: Subject to any disclaimer, the term of this patent is extended or adjusted under 35 U.S.C. 154(b) by 765 days.

(21) Appl. No.: 16/239,566

(22) Filed: Jan. 4, 2019

(65) Prior Publication Data

US 2019/0211954 A1 Jul. 11, 2019

(30) Foreign Application Priority Data

Jan. 5, 2018 (GB) .................................... 1800151

(51) Int. Cl.
*F16L 23/08* (2006.01)
*F16B 2/08* (2006.01)

(52) U.S. Cl.
CPC ................ *F16L 23/08* (2013.01); *F16B 2/08* (2013.01)

(58) Field of Classification Search
CPC . F16L 23/08; F16L 23/04; F16L 21/06; F16L 21/065; F16L 23/06; F16L 23/10; F16L 23/16; F16L 23/18; F16L 23/20; F16L 23/22; F16B 2/08
USPC ........ 285/367, 337, 365, 366, 407, 410, 420
See application file for complete search history.

(56) References Cited

U.S. PATENT DOCUMENTS

| | | | | | |
|---|---|---|---|---|---|
| 3,544,137 | A | * | 12/1970 | Contreras | F16L 27/04 285/261 |
| 8,052,490 | B2 | * | 11/2011 | Bernasch | H01R 4/643 439/775 |
| 2008/0276668 | A1 | * | 11/2008 | Stachowiak, Jr. | F16B 2/06 70/164 |
| 2015/0240845 | A1 | * | 8/2015 | Mann | F01N 13/1811 24/279 |
| 2015/0267729 | A1 | * | 9/2015 | Baudoin | F16L 23/08 24/483 |

FOREIGN PATENT DOCUMENTS

CN 104930280 10/2017
KR 20120020715 3/2012

OTHER PUBLICATIONS

English Translation of CN 104930280, Retrieved PatDocs Oct. 31, 2022.
English Translation of KR 20120020715, Retrieved from PatDocs Oct. 31, 2022.

* cited by examiner

*Primary Examiner* — Aaron M Dunwoody
(74) *Attorney, Agent, or Firm* — Woodard, Emhardt, Henry, Reeves & Wagner, LLP

(57) ABSTRACT

A clamp apparatus including band means which is annular or substantially annular in form. The band means has two opposing ends and protruding means are provided to protrude outwardly of the band means at each of the opposing ends. At least one of said protruding means is integrally formed with the band means.

20 Claims, 6 Drawing Sheets

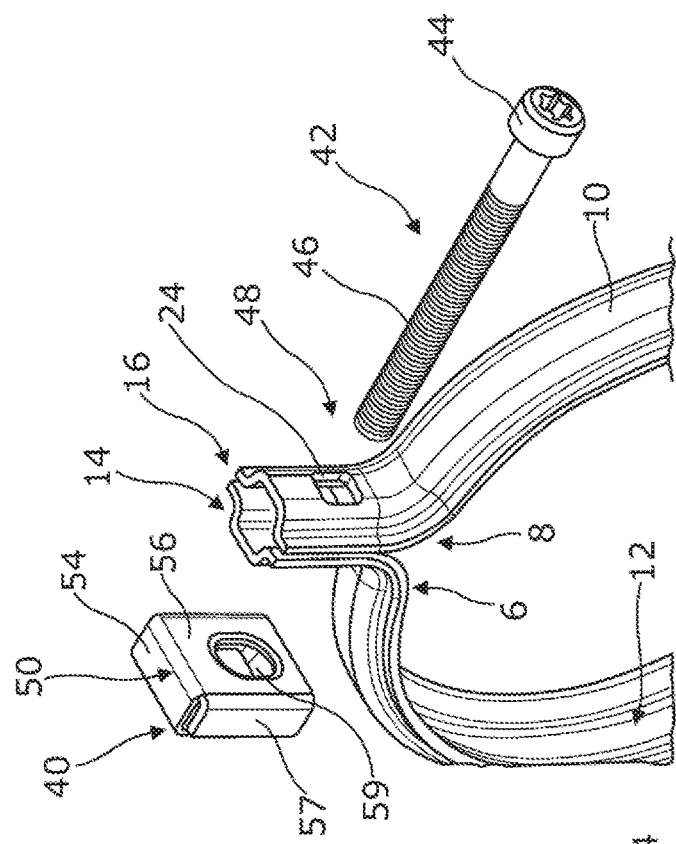
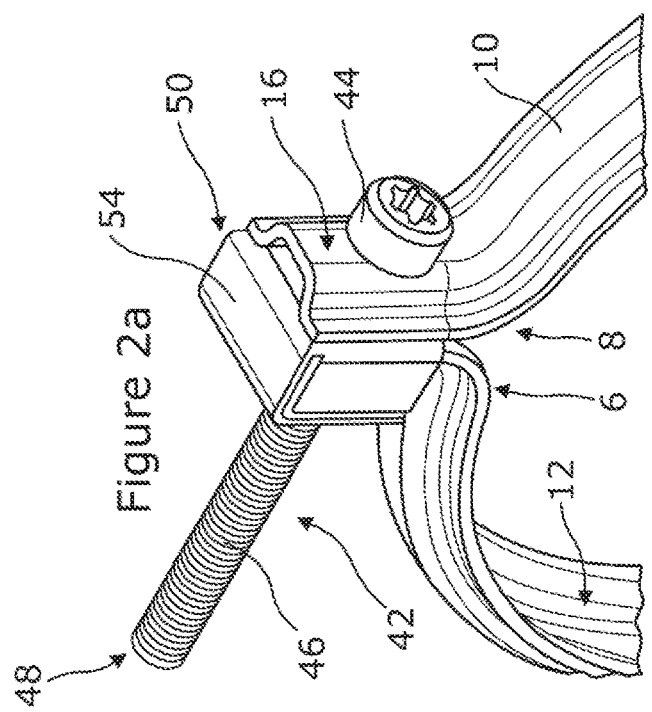
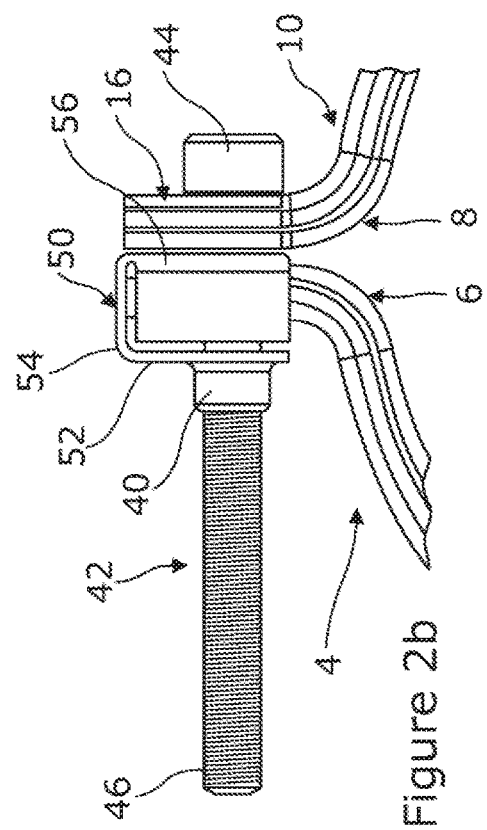

CLAMP APPARATUS AND METHOD OF USE OR MANUFACTURE THEREOF

FIELD OF THE INVENTION

This invention relates to clamp apparatus and to a method of use or manufacture thereof.

BACKGROUND TO THE INVENTION

Profile clamps are typically used for joining the ends of two pipes or conduits together in use. An example of a profile clamp comprises an annular clamping band having two opposing ends and a space defined between the ends. A lug is provided at each end of the band and the lugs, which are generally opposing each other, are arranged to protrude radially outwardly from the band. A tensioning device, such as for example a nut and bolt, is typically located between the two opposing lugs to allow the clamping band to be moved between clamped and unclamped positions in use. An example of a profile clamp is disclosed in US2015/0267729.

Conventionally, profile clamps have generally been formed by a metal pressing process. Problems associated with a conventional profile clamp are that the clamping band tends to lose its shape and form towards the lugs, particularly when the clamping band is placed under load in use. This can result in non-uniform contact between the clamp and the one or more items being clamped in use. A profiled clamp with a roller annular V-shaped profile could overcome this issue. However, this typically requires additional features to be welded or formed onto the ends of the v-shaped profile, thereby increasing the costs associated with manufacturing the clamp. In addition, this type of clamp is less able to adapt to changes in temperature, which can cause thermal expansion stresses in the clamp or underlying components.

It is therefore an aim of the present invention to provide clamp apparatus that overcomes the abovementioned problems.

It is a further aim of the present invention to provide a method of using or manufacturing clamp apparatus that overcomes the abovementioned problems.

It is a yet further aim of the present invention to provide profiled clamp apparatus or V-profiled clamp apparatus; and a method of using or manufacturing profiled clamp apparatus or V-profiled clamp apparatus.

SUMMARY OF THE INVENTION

The present invention provides clamp apparatus and methods of manufacture and use related thereto. One aspect of the present invention provides a clamp apparatus that includes band means which is annular or substantially annular in form, the band means having two opposing ends, protruding means protruding outwardly of the band means at each of the opposing ends, characterised in that at least one of said protruding means is integrally formed with the band means.

Another aspect of the present invention provides a clamp apparatus comprising:
 a) a substantially annular band having two opposing ends; and
 b) lugs protruding outwardly of the band at each of the opposing ends;
wherein at least one of said protruding lugs is integrally formed with the band.

Another aspect of the present invention provides a method of manufacturing clamp apparatus, said clamp apparatus including band means having two opposing ends, said method including forming the band means to be annular or substantially annular inform, forming protruding means protruding outwardly of the band means at each of the opposing ends, characterised in that at least one of said protruding means is integrally formed with the band means.

DESCRIPTION OF THE DRAWINGS

FIGS. 2a, 2b and 2c show a partial perspective view, a side view and a partial exploded view of clamp apparatus according to an embodiment of the present invention respectively, with at least part of the tensioning means arranged between the protruding means.

WRITTEN DESCRIPTION OF THE PREFERRED EMBODIMENTS

Figure 1:
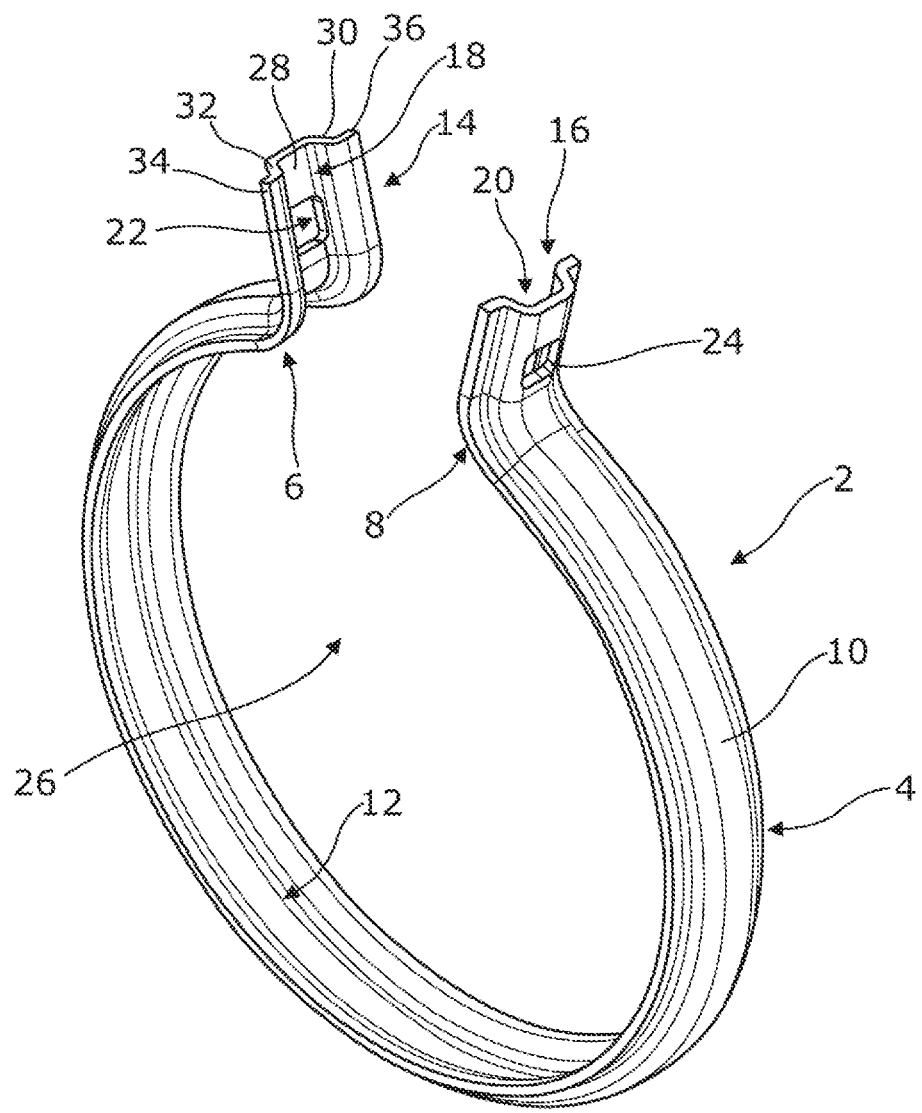
FIG. 1 is a perspective view of clamp apparatus according to an embodiment of the present invention.

For the purposes of promoting an understanding of the principles of the invention, reference will now be made to certain embodiments and specific language will be used to describe the same. It will nevertheless be understood that no limitation of the scope of the invention is thereby intended, with such alterations and modifications to the illustrated device being contemplated as would normally occur to one skilled in the art to which the invention relates.

Although the following description refers almost exclusively to clamp apparatus in the form of a V-clamp or a clamp having a V-shaped profile, it will be appreciated by persons skilled in the art that the present invention could relate to any type of clamp apparatus having any shaped profile.

According to a first aspect of the present invention there is provided clamp apparatus, said clamp apparatus including band means which is annular or substantially annular inform, the band means having two opposing ends, protruding means protruding outwardly of the band means at each of the opposing ends, characterised in that at least one of said protruding means is integrally formed with the band means.

The present invention therefore provides clamp apparatus wherein at least one of the outwardly protruding means is integrally formed with the band means. This reduces the time and cost associated with manufacturing the clamp apparatus. The shape and form of the clamp apparatus is maintained at at least the end with the integrally formed protruding means, thereby allowing a more uniform contact distribution with one or more items being clamped by the clamp apparatus in use, between the opposing protruding means and/or between an intermediate member and a protruding means when in the clamped positioned in; use. The apparatus of the present invention is found to have improved long-term load retention characteristics. It is more easily able to adapt to changes in thermal expansion as a result of changes of temperature in the locality in which the apparatus is used. In addition, the resulting clamp apparatus is found to be stronger and more resistant to external loads. This increase in strength has also been found to improve contact with any tensioning means that might be used with the protruding means in use.

Preferably the protruding means at both of said opposing ends are integrally formed with the band means. Thus, in one embodiment, the protruding means and the band means consist of a single piece integral member.

Preferably a single protruding means or member is provided at each opposing end of the band means. Thus, in this embodiment, the band means comprises two protruding members, one protruding member at each opposing end of the band means.

Preferably at least one, or both, of the protruding means are arranged to protrude outwardly of the band means by bending the same relative to the band means during manufacture.

In one embodiment the protruding means can be in the form of one or more lugs, protruding members, clamping heads, flange members and/or the like.

Preferably the band means consists of at least one band member having a generally annular form or shape with a space between the two opposing ends (i.e. the two opposing ends of the band means are not joined or in contact with each other, at least in the unclamped position). The length of the annular band member defines an aperture therebetween for the location of one or more items therethrough which are to be clamped by the clamp apparatus in use.

Preferably the band means is movable in use between a clamped position and an unclamped position. In the clamped position, the aperture defined by the band means is relatively small to clamp one or more items located therethrough to the clamp apparatus in use. In the unclamped position, the aperture defined by the band means is relatively large to allow one or more items to be located therethrough and/or removed from the same in use.

Preferably the clamp apparatus is a profiled clamp apparatus.

Preferably the band means has an inner or inwardly facing clamping surface and an outer surface. The inner or inwardly facing clamping surface faces towards and/or contacts one or more items being clamped in use. The outer or outwardly facing surface typically faces away from the one or more items being clamped in use.

Preferably the band means and/or at least the inner or inwardly facing clamping surface is profiled or has a shaped profile.

Preferably the band means and/or at least the inner or inwardly clamping surface has a V-shaped profile or a substantially V-shaped profile.

Preferably the clamp apparatus is in the form of V-clamp apparatus or V-profiled clamp.

Preferably the protruding means which is/are integrally formed with the band means has or have the same or substantially the same shape or profile as the band means, such as for example the same or substantially the same cross-sectional shape or profile.

Preferably the inner surface of the protruding means (i.e. the surface facing towards the opposing protruding means), which is integrally formed with the band means, has or have the same or substantially the same shape or profile as the inner clamping surface of the band means.

Thus, in one example, the profile surface of the band means and/or inner clamping surface is continuous or substantially continuous with the protruding means and/or inner surface of the protruding means.

In one embodiment at least one of the protruding means has a different profile to the profile of the annular band means. For example, the shape, size, dimensions and/or design of the profiles could be different.

Preferably the protruding means has a shaped profile, a V-shaped or substantially V-shaped profile.

Preferably the shaped profile, a v-shaped or substantially v-shaped profile of the protruding means is arranged to act like a spring under load when in the clamped position in use.

It has been found by the Applicants that the continuation of the profile of the band means to the protruding means allows for improved stress transition from the band means to the protruding means without any discontinuation.

Preferably the inner or inwardly facing surface of the protruding means (i.e. the surface of one protruding means which is opposite to the surface of the other protruding means) has the same or substantially the same profile as the band means and/or the inner clamping surface.

In one embodiment the protruding means protrude radially outwardly of the band means.

In one embodiment the protruding means protrude transversely outwardly of the band means at said opposing ends.

In one embodiment the opposing protruding means are parallel or substantially parallel to each other in use, such as in the clamped and/or unclamped positions.

In one embodiment at least part of one of the protruding means is arranged to engage directly with at least part of the opposing protruding means when the apparatus is in the clamped position in use.

Preferably the profile of the band means and/or the protruding means is such so as to define at least one recess or channel portion on an inner or inwardly facing surface thereof.

Preferably the recess or channel portion includes a base wall (i.e. arranged to face the item being clamped in use for the band means), and two opposing side walls protruding outwardly from said base wall (i.e. arranged to protrude towards the item being clamped in use for the band means).

In one embodiment the ends of the opposing side walls opposite to the base wall (i.e. the ends closest to the item being clamped in use for the band means) are provided with outwardly protruding flange portions. The flange portions protrude outwardly of the recess or channel portion. In one example, this arrangement is called a top hat arrangement.

The base wall, opposing side walls and flange portions are preferably integrally formed. Preferably the opposing flange portions of the opposing protruding means engage directly with each other when in the clamped position in one embodiment.

In one embodiment the ends of the opposing side walls opposite to the base wall (i.e. the ends closest to the item being clamped in use) are free edges and are not provided with outwardly protruding flange portions. In one example, this arranged is called a fez arrangement.

In one embodiment the protruding means at the opposing ends of the band means are arranged to be a spaced distance apart from each other when in the clamped position. For example, spacing means or one or more spacing members can be provided between the protruding means in use to provide this space between or separation of the protruding means.

Preferably the spacing means is any arrangement or member(s) that allow the band means to be placed under tension and/or that allows the protruding means at the ends of the opposing ends of the band means to be a required distance apart/together in the clamped and/or unclamped positions.

Preferably the spacing means are provided on, attached to, detachably attached to or associated with the protruding means and/or are provided on, attached to, detachably attached to or associated with tensioning means provided with the clamp apparatus in use.

Preferably the spacing means includes any or any combination of a plate member, spacing member, nut, washer, protrusion portion and/or the like.

In one embodiment the opposing protruding means are non-parallel to each other in the clamped and/or unclamped positions.

Preferably tensioning means are provided between the protruding means in use. The tensioning means are preferably arranged to move and/or maintain the band means, protruding means and/or clamp apparatus between a clamped position, wherein one or more items can be clamped between or by the band means, and an unclamped position, wherein one or more items can be removed from and/or located between or in the band means in use.

Preferably the tensioning means can include any or any combination of one or more nuts and bolts, trunnions, clips, inter-engaging members, any means which allow the protruding means to be moved towards and/or away from each other in use and/or the like.

In one embodiment one or more apertures are defined in the, or each, protruding means so as to allowing tensioning means to be located through, joined to and/or associated with the same in use.

In one embodiment spacing means are provided on or associated with the tensioning means.

In one embodiment the tensioning means is in the form of a nut and bolt and the spacing means include a further nut member located on a threaded portion of the bolt between the opposing protruding means, thereby maintaining the opposing protruding means a spaced distance apart even in the clamped position.

In one embodiment the tensioning means is in the form of a nut and bolt and the spacing means consists of contact means or contact member joined to or associated with the nut. The contact means or member is located or locatable between the opposing protruding means in use, and further preferably over one end of at least one of the protruding means, to prevent direct contact between the opposing protruding means when in a clamped position.

In one example, the contact means or member partially or wholly encloses one of the protruding means in use.

In one embodiment the contact means or member includes a first portion or end wall portion joined to the nut, a second portion or top wall portion joined to the first portion, and a third portion or further end wall portion joined to the second portion.

Preferably the first portion and third portion or end walls portions are parallel to substantially parallel to the protruding means.

Preferably the second portion is transverse, perpendicular or substantially perpendicular to the first portion, third portion, end wall portions and/or free end of the protruding means.

Preferably the second portion is located over a free end of at least one of the protruding means when fitted to the clamp apparatus in use.

Preferably one or more further portions or side wall portions are joined to the third portion and protrude towards the first portion. These further portions or wall portions help to enclose or substantially enclose at least one of the protruding means in use.

Preferably the band means and protruding means are roll formed. The roll forming manufacturing process results in the clamp apparatus being significantly stronger than a traditional press formed clamp apparatus. This makes the clamp apparatus of the present invention more resistant to external loads. The increase in strength also improves the contact with tensioning means that may be used with the clamp apparatus in use. This in turn increases the axial load of the clamp apparatus for a given torque.

Preferably the band means and protruding means are formed from metal, such as for example stainless steel.

In one embodiment the band means consists of a single band member.

In one embodiment the band means consists of two or more segments joined together.

Preferably the two or more segments are hingedly joined together. This allows movement of the two or more segments relative to each other when in the unclamped position in use.

In one embodiment one or more cut out sections are provided in the annular band means to increase the flexibility of the band means in use.

Preferably one or more cut out sections are provided in the opposing parts of the band means or side walls of the recess or channel section of the band means.

In one embodiment the opposing protruding means are of the same shape, size, dimensions and/or profile.

Preferably the band means and/or the protruding means are symmetrical.

In one embodiment the opposing protruding means are of a different shape, size, dimensions and/or profile.

Preferably the band means and/or the protruding means are asymmetrical.

Preferably the one or more items to be clamped by the clamp apparatus include one or more conduits, annular members and/or pipes.

Preferably the one or more conduits, annular members and/or pipes being clamped include one or more outwardly protruding flanges for clamping.

According to one aspect of the present invention there is provided a method of using or manufacturing clamp apparatus.

According to one aspect of the present invention there is provided a method of manufacturing clamp apparatus, said clamp apparatus including band means having two opposing ends, said method including forming the band means to be annular or substantially annular inform, forming protruding means protruding outwardly of the band means at each of the opposing ends, characterised in that at least one of said protruding means is integrally formed with the band means.

According to one aspect of the present invention there is provided a method of using clamp apparatus, said clamp apparatus including band means which is annular or substantially annular inform, the band means having two opposing ends, protruding means protruding outwardly of the band means at each of the opposing ends, characterised in that at least one of said protruding means is integrally formed with the band means, said method including the step of moving the band means between a clamped position, wherein the opposing ends of the band means are relatively close together, and an unclamped position, wherein the opposing ends of the band means are relatively further apart from each other compared to the clamped position.

According to one aspect of the present invention there is provided profiled clamp apparatus or V-profiled clamp apparatus.

According to one aspect of the present invention there is provided a method of using or manufacturing profiled clamp apparatus or V-profiled clamp apparatus.

Figure 3B:
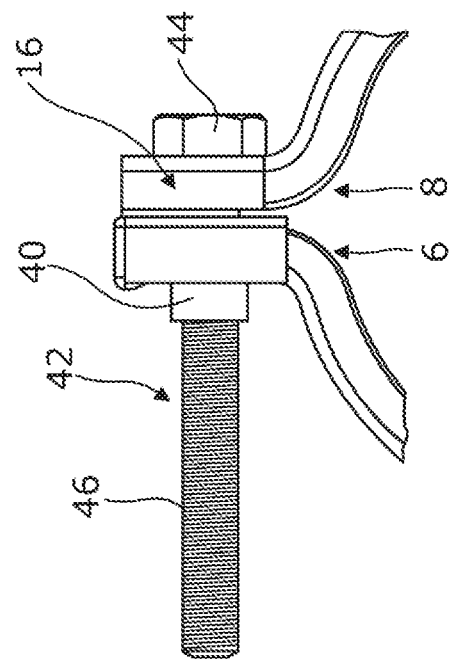
FIGS. 3a and 3b show a partial perspective view and a side view of clamp apparatus according to a further embodiment of the present invention respectively with at least part of the tensioning means arranged between the protruding means.
Figure 3A:
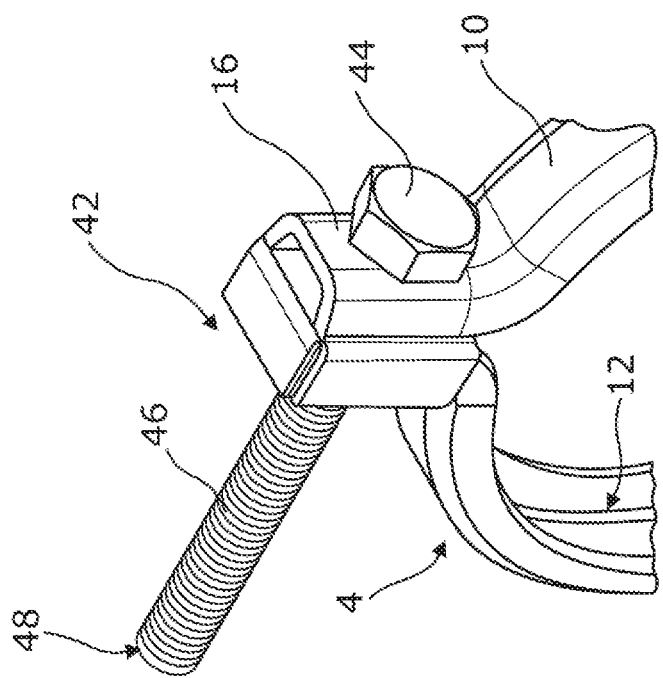
Figure 4A:
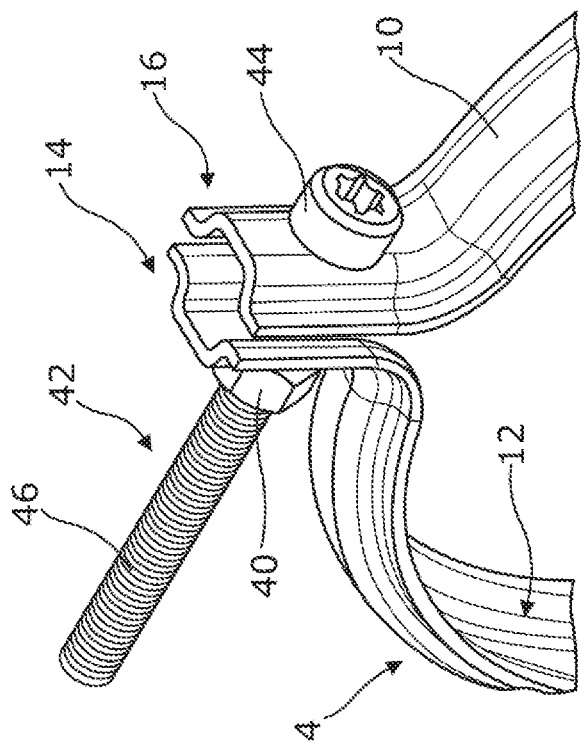
FIGS. 4a and 4b show a partial perspective view and a side view of clamp apparatus according to an embodiment of the present invention respectively with the protruding means arranged to directly contact each other when in a clamped position.
Figure 5A:
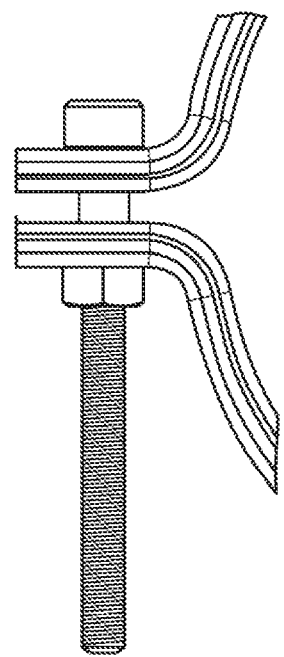
FIGS. 5a and 5b show a partial perspective view and a side view of clamp apparatus according to an embodiment of the present invention respectively with the protruding means being arranged a spaced distance apart from each other when in a clamped position.
Figure 4B:
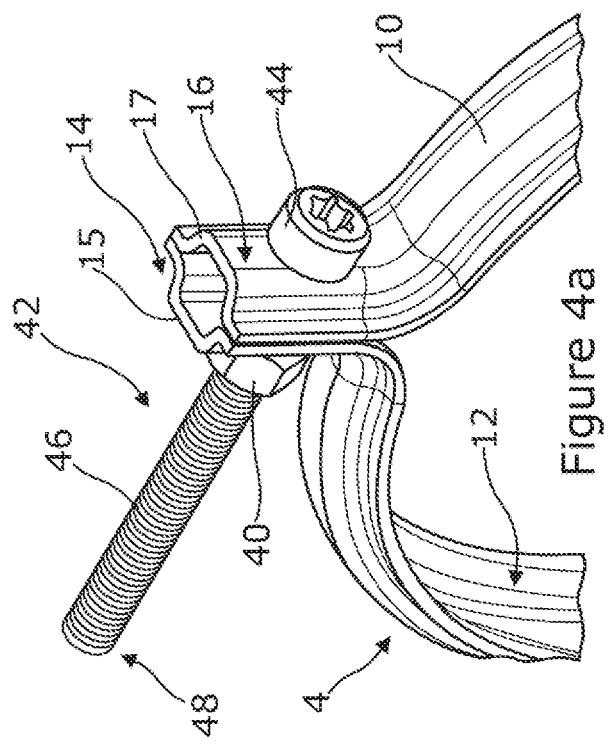
Figure 5B:
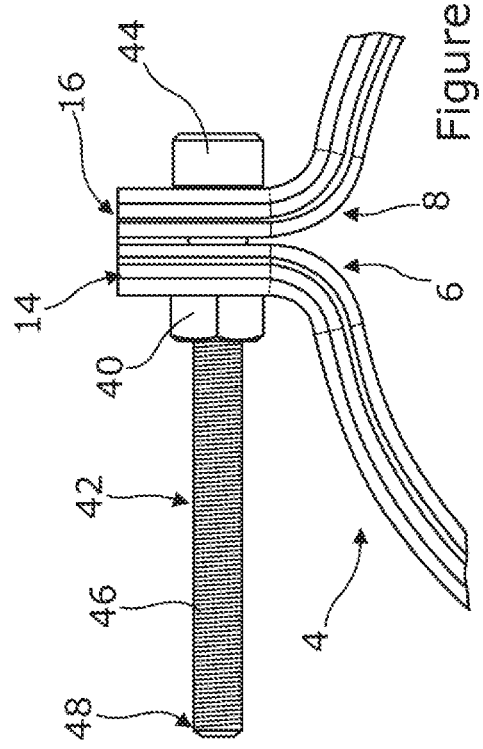
Figure 7B:
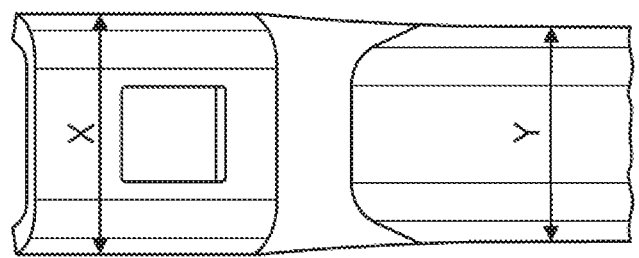
FIG. 7b is an end view of clamp apparatus according to an embodiment of the present invention wherein at least one of the protruding means has a different profile to the annular band means.
Figure 7A:
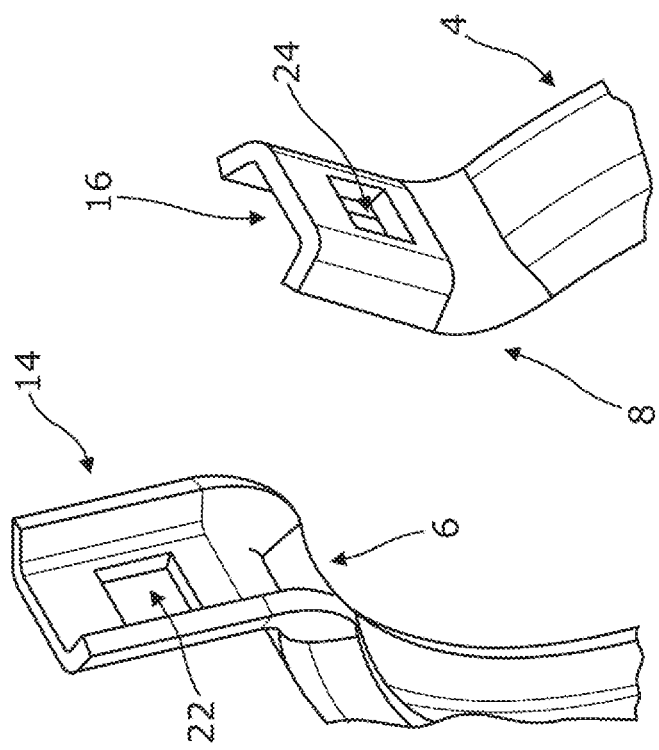
FIG. 7a is a partial perspective view of clamp apparatus according to an embodiment of the present invention wherein the protruding means have different profiles.
Figure 6:
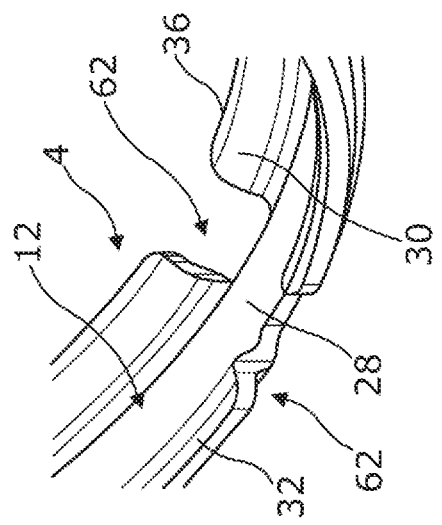
FIG. 6 is a partial perspective view of an annular band means with cut out sections provided according to an embodiment of the present invention.
Figure 8A:
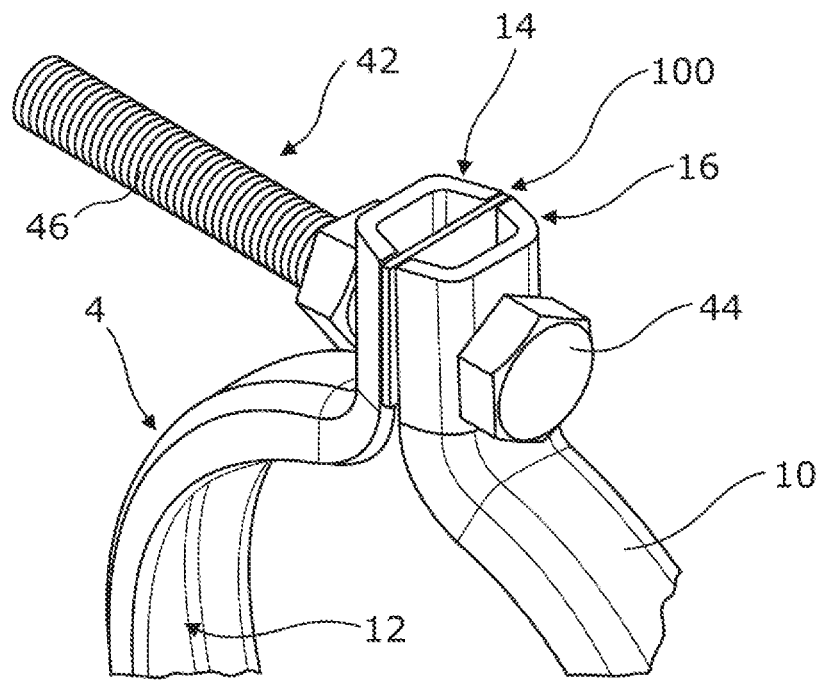
FIGS. 8a and 8b show a partial perspective view and a side view of clamp apparatus according to an embodiment of the present invention respectively with the protruding means being arranged a spaced distance apart from each other when in a clamped position using a washer or plate member.
Figure 8B:
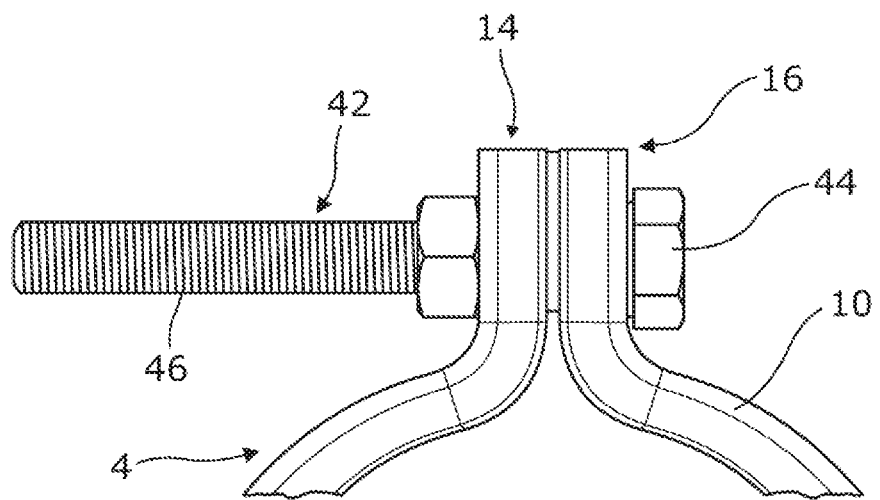

Embodiments of the present invention will now be described with reference to the following figures, wherein:

FIG. 1 is a perspective view of clamp apparatus according to an embodiment of the present invention;

FIGS. 2a, 2b and 2c show a partial perspective view, a side view and a partial exploded view of clamp apparatus according to an embodiment of the present invention respectively, with at least part of the tensioning means arranged between the protruding means;

FIGS. 3a and 3b show a partial perspective view and a side view of clamp apparatus according to a further embodiment of the present invention respectively with at least part of the tensioning means arranged between the protruding means;

FIGS. 4a and 4b show a partial perspective view and a side view of clamp apparatus according to an embodiment of the present invention respectively with the protruding means arranged to directly contact each other when in a clamped position;

FIGS. 5a and 5b show a partial perspective view and a side view of clamp apparatus according to an embodiment of the present invention respectively with the protruding means being arranged a spaced distance apart from each other when in a clamped position;

FIG. 6 is a partial perspective view of an annular band means with cut out sections provided according to an embodiment of the present invention;

FIG. 7a is a partial perspective view of clamp apparatus according to an embodiment of the present invention wherein the protruding means have different profiles;

FIG. 7b is an end view of clamp apparatus according to an embodiment of the present invention wherein at least one of the protruding means has a different profile to the annular band means; and FIGS. 8a and 8b show a partial perspective view and a side view of clamp apparatus according to an embodiment of the present invention respectively with the protruding means being arranged a spaced distance apart from each other when in a clamped position using a washer or plate member.

Referring to FIG. 1, there is illustrated clamp apparatus 2 according to an embodiment of the present invention. Apparatus 2 includes annular band means in the form of a single continuous annular band portion 4 having two opposing ends 6, 8. The band portion 4 has an outer surface 10 facing away from the one or more items being clamped in use, and an inner clamping surface 12 which is arranged to face towards and engage the one or more items being clamped in use.

Protruding means in the form of two lugs 14, 16 are provided at the opposing ends 6, 8 respectively of band portion 4. The lugs 14, 16 protrude radially outwardly of band portion 4.

In accordance with the present invention, lugs 14, 16 are integrally formed with the band portion 4, such that the band portion and lugs in combination provide a single continuous item.

The inner surface 12 of band portion 4 has a V-shaped profile and this V-shaped profile is continuous with the inner surface 18, 20 of the lugs 14, 16 respectively. The provision of the V-profile around the entire contact periphery of the apparatus 2 ensures a uniform contact distribution with the one or more items being clamped in use. In addition, the V-shaped profile of the lugs acts like a spring when placed under load. The continuation of the V-shaped profile between the band and the lugs allows for an improved stress transition from the band to the lugs without any discontinuation.

The lugs are typically integrally formed with the band portion in this example by roll forming the metal from which the apparatus is made. The resulting clamp is significantly stronger compared to clamps formed by conventional press manufacture. The clamp of the present invention is therefore more resistant to external loads.

An aperture 22, 24 is defined through each lug 14, 16 respectively to allow tensioning means or a tensioning device (not shown in this example) to be located between the same in use. The tensioning means or device allow the ends 6, 8 of band 4 to be moved towards each other to form a clamped position in use, and away from each other to form an unclamped position in use.

In the clamped position, one or more items to be clamped, such as for example one or more conduits or pipes, are located through the aperture 26 defined between the inner surfaces 12 of band 4 and held in place with respect to the clamp 2.

In the unclamped position, one or more items can be inserted into and/or removed from the aperture 26 defined between the inner surfaces 12 of band 4.

The aperture 26 is typically larger in size when in the clamped position compared to the unclamped position.

The V-profile of the inner surfaces 12, 18, 20 of the band 4 and lugs 14, 16 typically comprise a recess section having a base 28, and opposing side walls 30, 32 protruding from said base 28. The distance between the side walls 30, 32 immediately adjacent the base 28 is less than the distance between the side walls 30, 32 adjacent the opening to the recess section (opposite to base 28). Outwardly protruding flanges 34, 36 are provided at the ends of side walls 30, 32 furthest from base 28. The profile shape is integrally formed in the apparatus material during the manufacturing process.

FIGS. 2a-5b show examples of clamp apparatus according to the present invention with different arrangements of tensioning means or tensioning devices shown.

The same reference numerals used in FIG. 1 are used to refer to the same features in FIGS. 2a-5b.

In FIGS. 2a-2c, the tensioning means or device for moving the clamp apparatus between clamped and unclamped positions includes a nut 40 and a bolt 42. The nut 40 is arranged to contact a free end of lug 14 furthest from end 6 of band 4.

Bolt 42 consists of an elongate threaded portion 46 with a head portion 44 provided at an end thereof. In use, the threaded portion 46 is inserted through aperture 24 of lug 16 and through aperture 22 of lug 14. The head portion 44 is dimensioned such that it is too large to pass through aperture 24. A nut 40 is located on threaded portion 46 via end 48 thereof and is threadingly engaged with the threaded portion 46. Rotation of nut 40 on portion 46 towards lug 14 moves the lugs 14, 16 closer together to form a clamped position. Rotation of nut 40 on portion 46 away from lug 14 moves the lugs 14, 16 away from each other to form an unclamped position.

In this embodiment the nut 40 has a contact portion 50 joined to the same. The contact portion 50 is arranged, such that at least part of the same is located between the opposing surfaces of the lugs 14, 16 to separate the same from each other when in a clamped position. This provides an improved contact surface between the lugs 14, 16 in use. More particularly, the contact portion 50 has a first portion or end wall portion 52 that protrudes outwardly from nut 40 and is arranged transversally, and preferably perpendicular, thereto and to the longitudinal axis of threaded portion 46; a second portion or top portion 54 that is located over the free end of the lug 14 and is transverse, and preferably perpendicular, to the first or end wall portion (preferably the second portion is located at an end of the first portion); a third portion or further end wall portion 56 that is located between the lugs 14, 16 in use and which is parallel to end wall portion 52 (the third portion is located at an end of the second portion opposite to the first portion); two opposing side walls 57 are joined to the end wall portion 56 and protrude away from lug 16 (and towards end wall portion 52) to at least partially enclose lug 14 therebetween. Apertures 59 is defined through end walls 52 and 57 to allow the bolt 42 to pass through the same, in addition to the apertures 22, 24 on the lugs, in use.

The arrangement shown in FIGS. 3a and 3b is similar to that shown in FIGS. 2a-2c, with the exception that the v-profile of the band portion 4 in FIGS. 2a-2c is provided with the outwardly extending flanges 34, 36, whereas the v-profile of the band portion 4 in FIGS. 3a-3b does not have the outwardly extending flanges 34, 36. The band portion arrangement in FIGS. 2a-2c is often referred to as a top hat, whereas the band portion arrangement in FIGS. 3a-3b is often referred to as a fez. The use of encapsulating nut 40 having the contact portion 50 is particularly helpful in providing a contact surface between the lugs 14, 16 in FIGS. 3a-3b as the flanges 34, 36 are not present to provide a larger surface contact area between the lugs in this arrangement.

The arrangement shown in FIGS. 4a and 4b is based on a top hat band portion arrangement and includes a nut 40 and bolt 42 for the tensioning means, but there is no contact portion 50 associated with the nut 40. In this example, the opposing inner surfaces of the flanges 34, 36 of lugs 14, 16, and particularly at the top free ends 15, 17 of the lugs 14, 16, engage directly with each other when in the clamped position in use. This improves the rigidity of the joint. For example, if there is any collapse of the items being clamped in use, there is still some contact between the flanges 34, 36 of the lugs 14, 16 to maintain the load being applied by the nut and bolt. The arrangement also helps to prevent the joint being overloaded as a result of too much torque being applied to the same in use. These advantages also apply to the embodiments shown in FIGS. 2a-4b and 8a-8b.

The arrangement shown in FIGS. 5a and 5b is similar to that shown in FIGS. 4a and 4b, with the exception that a gap is maintained between the lugs 14, 16 in the clamped and unclamped positions. This ensures the opposing inner surfaces of flanges 34, 36 of lugs 14, 16 are always maintained a distance apart, even when the clamp apparatus is in a clamped position in use. An advantage of this arrangement is that the clamp can handle larger variations in tolerance for the joint components.

In the embodiment shown in FIG. 6, although a continuous annular band 4 and base wall 28 of the recess portion is provided, the opposing side walls 30, 32 of the recess portion defining the V-shaped profile is non-continuous at one or more locations on the band portion 4. More particularly, opposing cut out sections 62 are provided on opposing side walls 30, 32 and in the flanges 34, 36 of the recess portion of band 4 to improve the flexibility of the band portion 4 in use. It will be appreciated that any number of cut out sections can be provided as required. The provision of cut out portions may be particularly advantageous when clamping smaller diameter items in use.

In FIG. 1, the lugs 14, 16 are shown as having the same or substantially the same shape, size and design. However, with reference to FIG. 7a, it will be appreciated that in one embodiment the lugs 14, 16 could have a different shape, size and/or design. In this example, lug 14 is longer in length compared to lug 16.

In FIG. 1, the lugs 14, 16 have the same profile as the band 4 with which they are integrally formed with. However, with reference to FIG. 7b, it will be appreciated that in one embodiment one or both of the lugs 14, 16 could have a different profile to band 4. For example, the dimension or width 'X' of the lugs 14, 16 could be different to dimension or width 'Y' of the band 4. Although FIGS. 7a and 7b show a fez type of band arrangement, it will be appreciated that a similar arrangement could be provided with a top hat type of arrangement.

In FIGS. 8a and 8b, the band portion 4 has a fez type of band arrangement and, in order to improve the contact area between the lugs 14, 16, a washer 100 or plate member is provided between and clamped by the lugs 14, 16 when in a clamped position.

Clamp apparatus according to the present invention can have any or any combination of features described in the abovementioned figures.

The clamp apparatus of the present invention is disclosed in its priority patent application, namely, GB patent application No. 1800151.1, the entire contents of which are incorporated herein by reference.

In the foregoing description and subsequent claims the band may be the band means described and illustrated in the drawings, or it may be an alternative band configuration. Similarly, each of the lugs may be the lug or protruding means described and illustrated in the drawings, or it may be an alternative lug configuration.

While the invention has been illustrated and described in detail in the drawings and foregoing description, the same are to be considered as illustrative and not restrictive, it being understood that only certain preferred embodiments have been shown and described and that all changes and modifications that come within the spirit of the invention are desired to be protected. In addition, it is to be appreciated that the present invention may comprise or consist essentially of any or all of the described or illustrated features. For example, the present invention includes devices and methods comprising any or all of the features described or illustrated in specification or drawings, and the present invention includes devices and methods consisting essentially of any or all of the features illustrated in the specification or drawings. Additionally, any or all of the features and/or embodiments disclosed herein may be combined with any or all of the other features and/or embodiments disclosed herein to provide a device or method that comprises or consists essentially of such features.

The invention claimed is:

1. Clamp apparatus, said clamp apparatus including band means which is annular or substantially annular in form, the band means having two opposing ends, protruding means protruding outwardly of the band means at each of the opposing ends to form first and second protruding means; tensioning means provided between the protruding means; the tensioning means being arranged to move the protruding means and the band means between a clamped position, wherein one or more items can be clamped between or by the band means in use, and an unclamped position, wherein the one or more items can be removed from and/or located between or in the band means in use;
   at least one of said first and second protruding means is integrally formed with the band means;
   wherein a profile of the band means and the protruding means, or the protruding means, defines at least one channel portion on an inner or inwardly facing surface thereof;
   the at least one channel portion including a base wall and two opposing side walls protruding outwardly from the base wall and having ends;
   wherein the tensioning means are associated with the base wall of the at least one channel portion of the at least one of the first and second protruding means;
   wherein the ends of the side walls opposite the base wall of each of the first and second protruding means either having flange portions that protrude outwardly of the channel portion and form a top hat arrangement, or having free ends that form a fez arrangement;
   and wherein the clamp apparatus is arranged such that when in the clamped position, the clamp apparatus is in one of the following arrangements:
   a) in the top hat arrangement, and opposing inner surfaces of the flange portions of the first and second protruding means are engaged directly with each other; or
   b) in the top hat arrangement, spacing means are provided on, attached to, detachably attached to or associated with the protruding means and/or tensioning means, and wherein the spacing means are provided between opposing inner surfaces of the flange portions to separate the first and second protruding means and to provide a contact surface that directly engages with the opposing inner surfaces of the flange portions; or
   c) in the fez arrangement, spacing means are provided on, attached to, detachably attached to or associated with the protruding means and/or tensioning means, and wherein the spacing means are provided between opposing surfaces of the free ends of the side walls of the protruding means to separate the opposing surfaces of the free ends of the side walls and to provide a contact surface that directly engages with the opposing surfaces of the free ends of the side walls.

2. Clamp apparatus according to claim 1 wherein the protruding means at both of said opposing ends of the band means are integrally formed with the band means, such that the protruding means and the band means consist of a single piece integral member.

3. Clamp apparatus according to claim 1 wherein at least one, or both, of the protruding means are arranged to protrude outwardly of the band means as a result of bending the same relative to the band means during manufacture.

4. Clamp apparatus according to claim 1 wherein the profile of the band means, an inner or inwardly facing surface of the band means and/or an inwardly facing surface of the protruding means is a V-shaped profile or a substantially V-shaped profile.

5. Clamp apparatus according to claim 4 wherein the band means, an inner or inwardly facing surface of the band means has the same or substantially the same shape, size, dimensions and/or design profile as at least one of the protruding means.

6. Clamp apparatus according to claim 4 wherein the band means, an inner or inwardly facing surface of the band means has a different shape, size, dimensions and/or design profile of at least one of the protruding means.

7. A clamp apparatus according to claim 4 wherein the V-shaped profile or substantially V-shaped profile of the band means extends from one protruding means to the other.

8. Clamp apparatus according to claim 1 wherein the protruding means protrude radially outwardly or protrude transversally outwardly of the band means at the opposing ends.

9. Clamp apparatus according to claim 1 wherein the spacing means include any or any combination of a plate member, a spacing member, nut, washer and/or protrusion portion.

10. Clamp apparatus according to claim 1 wherein tensioning means are provided between the protruding means at the opposing ends of the band means to move and/or maintain the protruding means in a clamped or unclamped position in use in the top hat arrangement.

11. Clamp apparatus according to claim 10 wherein the tensioning means includes any or any combination of one or more nuts and bolts, trunnions, inter-engaging members or any means for moving the protruding means towards and/or away from each other in use.

12. Clamp apparatus according to claim 11 wherein the tensioning means is in the form of a nut and bolt and the spacing means includes a contact member joined to or associated with the nut so as to be locatable between opposing protruding means when the apparatus is in a clamped position in use.

13. Clamp apparatus according to claim 1 wherein the tensioning means includes any or any combination of one or more nuts and bolts, trunnions, inter-engaging members or any means for moving the protruding means towards and/or away from each other in use.

14. Clamp apparatus according to claim 13 wherein the tensioning means is in the form of a nut and bolt and the spacing means includes a contact member is joined to or associated with the nut so as to be locatable between opposing protruding means when the apparatus is in a clamped position in use.

15. Clamp apparatus according to claim 14 wherein the contact member is formed so as to partially or wholly enclose at least one of the protruding means when in a clamped position in use.

16. Clamp apparatus, said clamp apparatus including band means which is annular or substantially annular in form, the band means having two opposing ends, protruding means protruding outwardly of the band means at each of the opposing ends, characterised in that at least one of said protruding means is integrally formed with the band means; wherein a profile of the band means and the protruding means, or the protruding means, defines at least one channel portion on an inner or inwardly facing surface thereof, the at least one channel portion including a base wall and two opposing side walls protruding outwardly from the base wall and having ends, the ends of the side walls opposite the base wall having outwardly protruding flange portions to form a top hat arrangement; opposing inner surfaces of the flange portions of the protruding means in the top hat arrangement being arranged to engage directly with each other when the apparatus is in a clamped position in use; or wherein spacing means are provided on, attached to, detachably attached to or associated with the protruding means and/or tensioning means for moving the apparatus between clamped and unclamped positions in use, to provide the flange portions or free ends of the side walls of the protruding means a spaced distance apart from each other and to provide a contact surface for contact between the opposing inner surfaces of the flange portions or the free ends of the side walls of the protruding means and the spacing means when in a clamped position.

17. Clamp apparatus, comprising:
   (a) band means which is annular or substantially annular in form, the band means having two opposing ends,
   (b) protruding means protruding outwardly of the band means at each of the opposing ends,
   characterised in that at least one of said protruding means is integrally formed with the band means;
   wherein a profile of the band means and the protruding means, or the protruding means, defines at least one channel portion on an inner or inwardly facing surface thereof;
   wherein the at least one channel portion includes a base wall and two opposing side walls protruding outwardly from the base wall and having ends;
   wherein the ends of the side walls opposite the base wall have outwardly protruding flange portions that form a top hat arrangement;
   wherein opposing inner surfaces of the flange portions of the protruding means engage directly with each other when the apparatus is in a clamped position in use.

18. Clamp apparatus, comprising:
   (a) band means which is annular or substantially annular in form, the band means having two opposing ends;
   (b) protruding means protruding outwardly of the band means at each of the opposing ends;
   characterised in that at least one of said protruding means is integrally formed with the band means;
   wherein a profile of the band means and the protruding means, or the protruding means, defines at least one channel portion on an inner or inwardly facing surface thereof,
   the at least one channel portion including a base wall and two opposing side walls protruding outwardly from the base wall and having ends,
   the ends of the side walls opposite the base wall having outwardly protruding flange portions to form a top hat arrangement;
   (c) spacing means provided on, attached to, detachably attached to or associated with the protruding means, wherein the spacing means are provided between opposing surfaces of the free ends of the side;
   wherein opposing inner surfaces of the flange portions of the protruding means engage directly with opposing surfaces of the spacing means to keep the flange portions a spaced distance apart from each other when in a clamped position.

19. Clamp apparatus, comprising:
   (a) band means which is annular or substantially annular in form, the band means having two opposing ends;
   (b) protruding means protruding outwardly of the band means at each of the opposing ends;
   characterised in that at least one of said protruding means is integrally formed with the band means;
   wherein a profile of the band means and the protruding means, or the protruding means, defines at least one channel portion on an inner or inwardly facing surface thereof;
   wherein the at least one channel portion includes a base wall and two opposing side walls protruding outwardly from the base wall and having ends;
   wherein the ends of the side walls opposite the base wall form a fez arrangement; and
   (c) spacing means having opposing side contact surfaces;
   wherein each of the ends of the side walls of the protruding means engages directly with a contact surface of the spacing means, so that the spacing means contacts and is held between the ends of the side walls of the protruding means.

20. A method of manufacturing clamp apparatus, said clamp apparatus including band means having two opposing ends, said method including
   forming the band means to be annular or substantially annular in form,
   forming protruding means protruding outwardly of the band means at each of the opposing ends, at least one of said protruding means being integrally formed with the band means,
   forming a profile of the band means and the protruding means, or the protruding means, to define at least one channel portion on an inner or inwardly facing surface thereof, the at least one channel portion including a base wall and two opposing side walls protruding outwardly from the base wall and having ends, the ends of the side walls opposite the base wall having outwardly protruding flange portions to form a top hat arrangement having flange portions;
   wherein the opposing inner surfaces of the flange portions of the protruding means in the top hat arrangement are arranged to engage directly with each other when the apparatus is in a clamped position in use;
   or wherein spacing means are provided on, attached to, detachably attached to or associated with the protruding means and/or tensioning means for moving the apparatus between clamped and unclamped positions in use, to provide the flange portions or free ends of the side walls of the protruding means a spaced distance apart from each other and to provide a contact surface for contact between the opposing inner surfaces of the flange portions or the free ends of the side walls of the protruding means and the spacing means when in a clamped position.

* * * * *